(No Model.)

R. GARICH.
ALIGNING INSTRUMENT.

No. 322,921. Patented July 28, 1885.

Witnesses:
J. B. Halpenny
C. B. Morse

Inventor:
Robert Garich
per F. F. Warner
his Attorney.

UNITED STATES PATENT OFFICE.

ROBERT GARICH, OF CHICAGO, ILLINOIS.

ALIGNING-INSTRUMENT.

SPECIFICATION forming part of Letters Patent No. 322,921, dated July 28, 1885.

Application filed October 8, 1884. (No model.)

*To all whom it may concern:*

Be it known that I, ROBERT GARICH, residing at Chicago, in the county of Cook and State of Illinois, have invented certain new and useful Improvements in Aligning-Instruments, of which the following, in connection with the accompanying drawings, is a specification.

Figure 1:
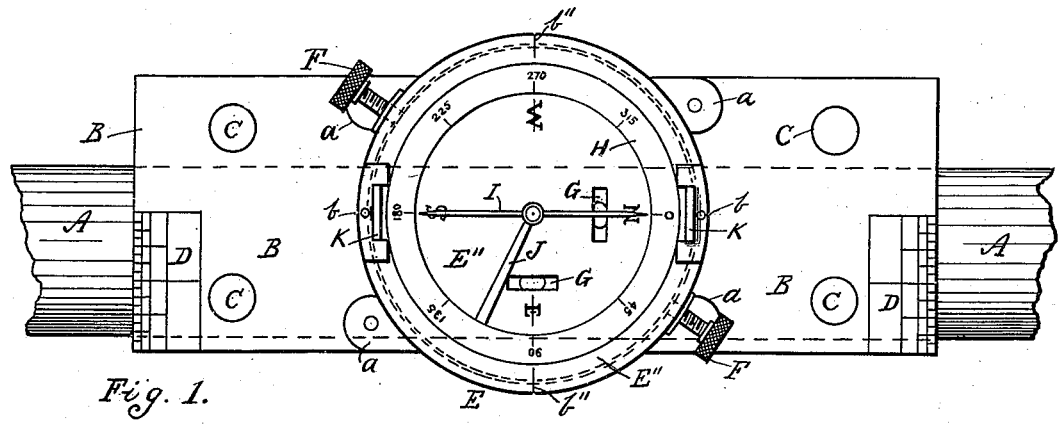
Figure 2:
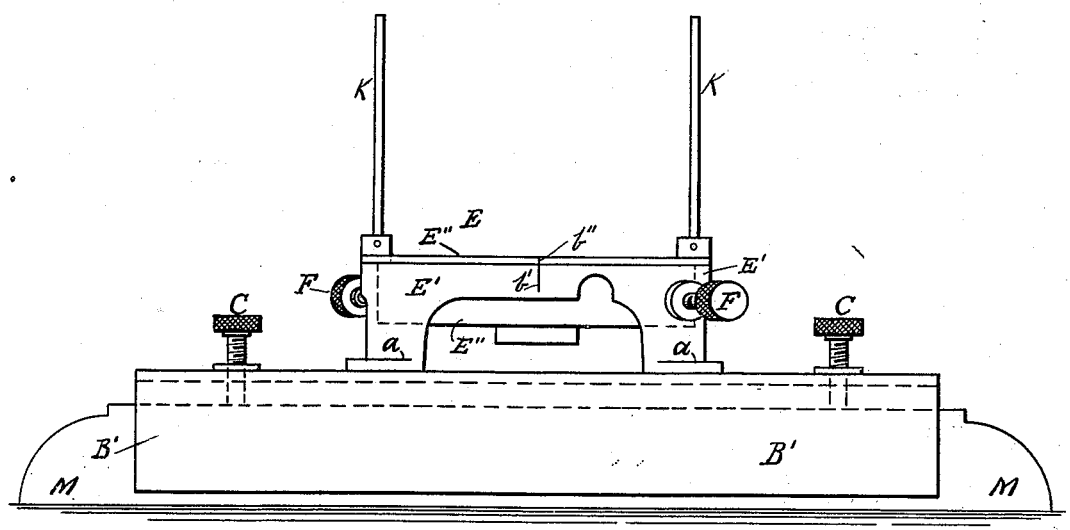
Figure 3:
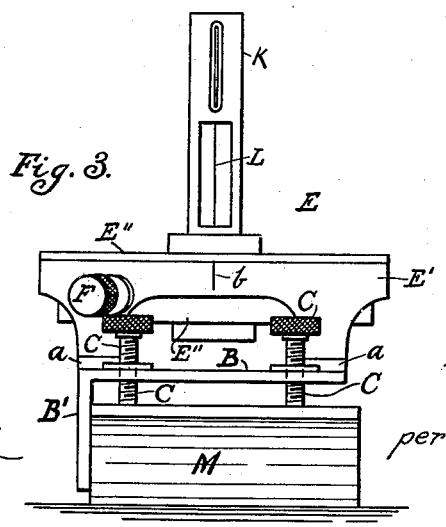

In the drawings, Figure 1 is a top or plan view of an instrument embodying my invention. Fig. 2 is a side view thereof, and Fig. 3 is an end view of the same.

Like letters of reference indicate like parts.

The chief purpose of my invention is to provide means for facilitating much of the work of locating or hanging shafting for driving gearing, a part of which consists of pulleys or belt wheels and of belts running thereon. Experience has shown that when one line of such shafting is not parallel with or properly located with relation to another, and over both of which the same belts run, the belts are liable to run off their wheels or pulleys. Again, in putting up such shafting, especially when it is the intention to extend it from one room into another, errors in locating the holes in the walls through which the shafting is to pass have not been uncommon.

The work of ascertaining the position or proper location of the shafting has heretofore required many measurements to be made by means of a tape-line or other similar and common methods, and mistakes were liable to occur even when much care was exercised in order that accuracy might result. I aim to avoid the necessity of many such calculations, and this I accomplish by means of the instrument which I will now proceed to describe.

A represents a section of shafting of the class referred to.

B is a plate, and B' is a flange depending from one edge thereof.

C C are leveling-screws passing vertically through the plate B.

D D are graduated portions of the upper surface of the plate B. These graduations are made, as shown, at the corners which are met by the flange B'.

E is a compass, and E' is its annulus or support, the legs $a\,a$ of which are rigidly attached to the upper face of the plate B.

F F are binding-screws passing through the support E', and having their inner ends in position for contact with the needle-box E'' when the said screws are so turned as to move inward or in the direction of the said box.

The compass is constructed and adapted for operation in the usual manner, having therein leveling-tubes G G, a graduated circle or ring, H, a needle, I, a needle-lifter, J, and sights K K, in which are the usual sighting-wires, L L; but I have made upon the support E' two marks or lines, $b\,b$, in a line with the innermost lines of the graduations D D, and exactly between the lines $b\,b$, I have made two other lines, $b'\,b'$, also on the support E', thus marking the said support off into quarters. On opposite sides of the rim of the box E'', and exactly between the sights, I have made two marks, $b''\,b''$.

M is a loose or separate block made smooth or level on top and having a straight edge to meet the flange B'.

To use this instrument for the purposes for which it is principally intended, I proceed as follows: If no shafting has yet been hung, or if that to be put up need have no relation to that already up, I first ascertain where, or about where, the new shafting is to be placed. For example, beginning with reference to the main shaft, I locate the block M in the line to be occupied by that shaft, and secure the said block there temporarily in any suitable way. I then set the plate B, with the parts connected thereto, on the said block, which latter serves for the time being as a support for the said plate, in lieu of the said shaft, it being understood that the flange B' is to be, along its entire length, in contact with the straight edge of the said block and in the line to be occupied by the said shaft. I then adjust the compass in the usual manner, and set the sighting-lines in a line passing longitudinally along the plate B and coinciding with the innermost lines of the graduations D D. This line is presumed for the time being to be the line running longitudinally and centrally along the main shaft. I then sight through the sights of the compass, and mark where the line so indicated meets the walls, or direct an assistant to make such marks or their equivalent. I note the angle indicated by the compass, and lock the box E'' by means of the screws F F. The instrument may now be temporarily dispensed with; but, as will be perceived, I may now mark out or indicate the position to be occupied by the hangers for the main shaft, being governed in so doing by the marks or guides already furnished by means of the instrument, and using, if need be, a plummet and measure to aid me in so doing. The shaft-hangers being properly located, the shaft itself will be in the place desired. If I afterward wish to locate other shafting, which is to be parallel, for example, to the main shaft, I take the instrument to the required distance from the said shaft, and so place the instrument that the needle will point to the same figures before indicated. I thus designate the angle of the main shaft, and by sighting through the instrument will discover where to place marks so that the position to be occupied by the second line of shafting, when parallel to the first, may be ascertained and aligned or marked out with facility.

When I wish to designate or align the position of a line of shafting at right angles to another line, I proceed substantially as last-above described, excepting that I first turn the box E″ one-quarter farther around on its seat. When some of the shafting is already up, I place the plate B directly thereon in making the first observation.

In setting the instrument on a shaft which is shown to be out of level, I first make that shaft level, and then proceed as described; or I may use the block M and adjust the instrument thereon, as at first described.

This instrument, as will now be perceived, may also be used for other purposes—as, for example, in determining the true position of machinery—and will be especially serviceable in aligning such machines as are driven by belting on shafting or driving gearing like or similar to that already described.

Having thus described my invention, what I claim as new, and desire to secure by Letters Patent, is—

1. An aligning-instrument consisting of a compass combined with sight-vanes, and a base-plate having a flange or depending edge, B′, thereon, substantially as and for the purposes specified.

2. An aligning-instrument consisting of a compass having sights on a needle-box rotary on its seat, combined with a base-plate having a flange or depending edge, B′, substantially as and for the purposes specified.

3. The combination, in an aligning-instrument, of a compass having a needle in a rotary box provided with sights, of the support E′, of the screws F F, and of the base-plate B, having thereon the depending flange B′, substantially as and for the purposes specified.

4. The combination, in an aligning-instrument, of a compass having a needle in a rotary box provided with sights, of the support E′, of the screws F F, of the flanged plate B B′, and of the screws C C, substantially as and for the purposes specified.

5. The combination, in an aligning-instrument, of a compass having a needle in a rotary box provided with sights, and having thereon the marks b″ b″, of the screws F F in the said support, of the flanged plate B B′, and of the screws C C in the said plate, substantially as and for the purposes specified.

6. The combination, in an aligning-instrument, of a compass, sights or sight-vanes K K, a plate, B, having thereon a flange, B′, and the block M, substantially as and for the purposes specified.

In testimony that I claim the foregoing as my own I hereto affix my signature in presence of two witnesses.

ROBERT GARICH.

Witnesses:
M. BYRON RICH,
GEO. W. UNDERWOOD.